(No Model.) 2 Sheets—Sheet 1.
H. C. HIGGINSON.
APPARATUS FOR MANUFACTURING WHITING.
No. 499,994. Patented June 20, 1893.
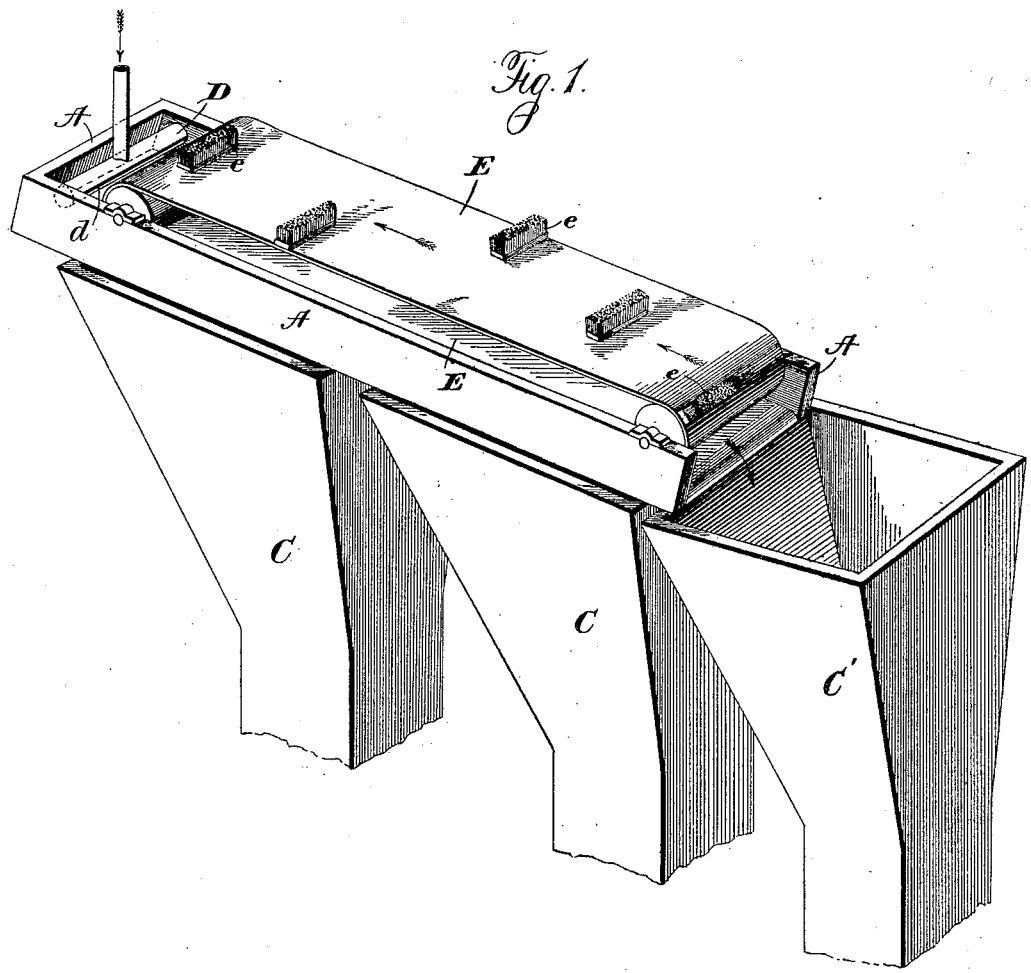

(No Model.) 2 Sheets—Sheet 2.
H. C. HIGGINSON.
APPARATUS FOR MANUFACTURING WHITING.
No. 499,994. Patented June 20, 1893.
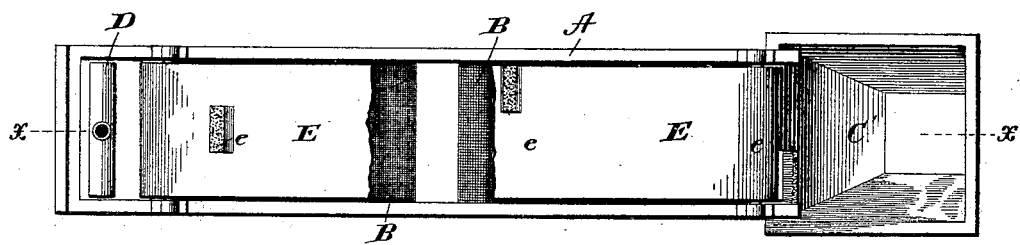
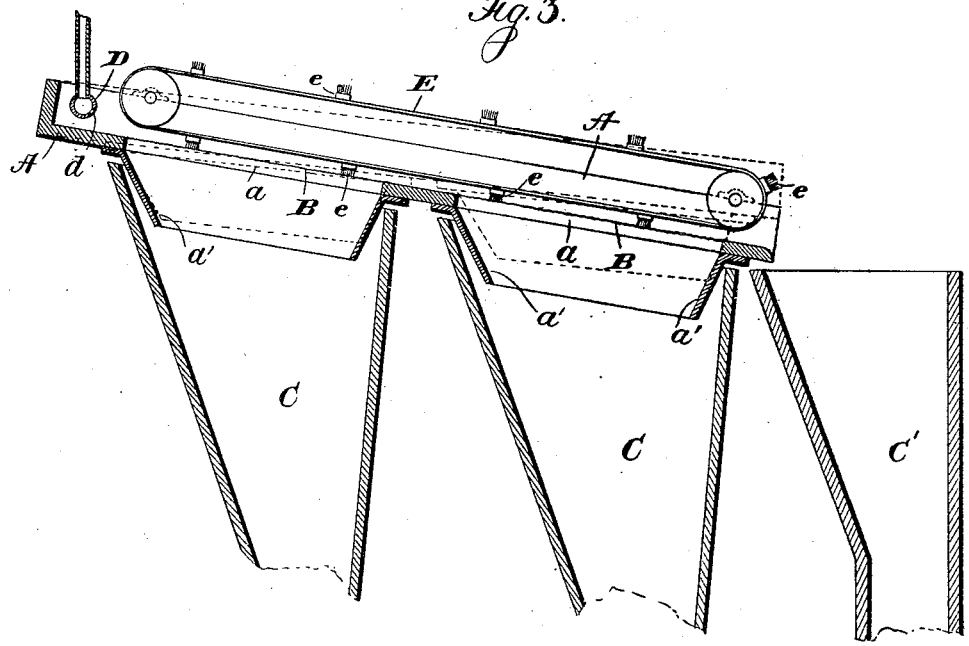

United States Patent Office.

HENRY C. HIGGINSON, OF NEWBURG, NEW YORK.

APPARATUS FOR MANUFACTURING WHITING.

SPECIFICATION forming part of Letters Patent No. 499,994, dated June 20, 1893.

Application filed October 10, 1891. Serial No. 408,303. (No model.)

*To all whom it may concern:*

Be it known that I, HENRY C. HIGGINSON, of Newburg, in the county of Orange, and in the State of New York, have invented certain new and useful Improvements in Apparatus for Manufacturing Whiting; and I do hereby declare that the following is a full, clear, and exact description thereof, reference being had to the accompanying drawings, in which—

Figure 1 is a perspective of my apparatus as arranged for use. Fig. 2 is a plan view of the same from the upper side, and Fig. 3 is a vertical section upon line $x\,x$ of Fig. 2.

Letters of like name and kind refer to like parts in each of the figures.

The object of my invention is to enable whiting to be easily and accurately separated into two or more grades, and to such end my said invention consists in the apparatus employed, substantially as and for the purpose hereinafter specified.

In the carrying of my invention into practice I employ a trough or chute A which has any desired length and transverse dimensions and at its ends is suitably supported or suspended so as to be capable of such adjustment as will give any desired inclination from a horizontal plane. The upper end of said chute is closed, but its lower end open and unobstructed.

Within the bottom of the chute A are provided two or more openings $a$ and $a$ which extend, preferably, nearly or entirely across the same, have any desired length and are separated from the adjacent opening or openings by a distance equal to about one fourth their length. Each of said openings is covered by a screen of wire cloth or perforated metal B which has a predetermined size of mesh or perforation and the screens are relatively arranged according to such size of opening, the finest screen being over the opening at the upper end of the chute and the next coarse screen over the next succeeding opening. Immediately below and surrounding each opening $a$ is an inwardly and downwardly inclining curb or guide $a'$ which extends downward into the mouth of a hopper C that communicates with a suitable receptacle and operates to convey into the latter any material that passes downward through such screened opening. A similar hopper C' arranged at the lower end of the chute A receives such material as has failed to pass through said screens and falls from the said chute end.

Within the upper end of the chute A is a tube D that is arranged transversely, is connected with a reservoir or other source of supply of the material to be separated and along its front side has a slot $d$ or a line of perforations through which such material may be discharged in a sheet across the entire bottom of said chute.

The apparatus thus constructed is used as follows, viz: Ground or pulverized whiting suspended in water is permitted to flow from the tube D and falling upon the bottom of the chute A runs downward over the same with a velocity corresponding to the inclination of the latter. As the material passes over the first or finest screen, B, all of the particles which are sufficiently small pass through the same and into their proper receptacle, while the remaining material passes downward, and at each screen the sifting operation is repeated until those particles which are too large to pass through either screen are dropped into the hopper C' and may constitute a low grade, or they may be again passed through the pulverizing mechanism and then returned to the sifting mechanism. In order that the screens may not become clogged, I preferably employ a cleaning mechanism which consists of a suitably driven endless belt E which is arranged above and parrallel with the bottom of the chute A and is provided with brushes $e$ and $e$ that bear upon said screen bottom and by the motion of said belt are caused to move lengthwise across the face of each screen, the motion being upward against the flow of the liquid material. Said brushes do not extend across the belt—as such might cause a stoppage of the flow of the material to be sifted— but, preferably, have each a length equal to about one third the width of said belt and they are arranged so that three brushes acting in succession will clear the entire face of each screen.

The mechanism described enables the material to be separated into grades just as it is produced by the crusher and not only does away with the cumbersome settling vats heretofore employed, but enables the work to be continuously carried on—nothing more being necessary than to supply the crusher with raw material and to remove the completed article from the bins.

Having thus described my invention, what I claim is—

1. In apparatus for grading whiting, in combination with a series of inclined graded screens, a tube or pipe for discharging whiting suspended in liquid to said screens arranged transversely at the upper end thereof and having a slit in its side to discharge the liquid and whiting in a thin sheet, substantially as and for the purpose specified.

2. In apparatus for grading whiting, in combination with an inclined chute having in its bottom several graded screens, that are successively coarser a tube or pipe for discharging whiting suspended in a liquid into said chute, placed transversely at the upper end thereof, and having a slit in its side to discharge the liquid and whiting in a thin sheet, substantially as and for the purpose shown.

3. In apparatus for grading whiting in combination with an inclined chute having in its bottom several graded screens, a tube or pipe placed transversely at the upper end thereof and having a slit in its side to discharge whiting suspended in a liquid into said chute in a thin sheet, and an endless belt arranged to be moved over the screens and provided with brushes to engage with and clear the same, substantially as and for the purpose set forth.

In testimony that I claim the foregoing I have hereunto set my hand this 1st day of October, 1891.

H. C. HIGGINSON.

Witnesses:
 GEO. S. PRINDLE,
 E. E. ROOSA.